United States Patent [19]

Francois et al.

[11] Patent Number: 5,479,404
[45] Date of Patent: Dec. 26, 1995

[54] SYSTEM FOR NETWORK WIDE BANDWIDTH ALLOCATION

[75] Inventors: Pascal Francois, Vence; Eric Lebrun, Saint Jeannet, both of France; Jeffrey R. Warren, Kingston, N.Y.

[73] Assignee: International Business Machines Corporation, Armonk, N.Y.

[21] Appl. No.: 192,872

[22] Filed: Feb. 7, 1994

[30] Foreign Application Priority Data

Apr. 19, 1993 [EP] European Pat. Off. .............. 93480041

[51] Int. Cl.⁶ ..................................................... H04J 3/22
[52] U.S. Cl. .......................................... 370/84; 370/85.15
[58] Field of Search ........................... 370/85.12, 85.13, 370/85.14, 85.15, 85.4, 85.5, 58.1, 85.1, 58.3, 84, 118, 68; 340/825.05, 825.5, 825.51

[56] References Cited

U.S. PATENT DOCUMENTS

| | | | |
|---|---|---|---|
| 4,979,167 | 12/1990 | McCool | 370/85.12 |
| 5,065,397 | 11/1991 | Shiobara | 370/85.12 |
| 5,119,374 | 6/1992 | Firoozmand et al. | 370/85.15 |
| 5,136,581 | 8/1992 | Muehrcke | 370/62 |
| 5,282,199 | 1/1994 | Herzberg et al. | 370/85.15 |

OTHER PUBLICATIONS

"Continuous Media Communication with Dynamic QoS Control Using ARTS with an FDDI Network" by Takudu et al. Proceedings of the ACM Sigcomm '92 Conf., vol. 22, No. 4, Aug. 1992, pp. 88–98.

"Eurobridge: Communications Services for Multimedia Applications", Heinrichs et al. Electronics & Communication Engineering Journal, vol. 5, No. 1, Feb. 1993.

"FDDI-A LAN Among MANs" by Ross et al Computer Communications Review, vol. 20, No. 3, Jul. 1990, pp. 16–31.

Primary Examiner—Douglas W. Olms
Assistant Examiner—Ajit Patel
Attorney, Agent, or Firm—Joscelyn G. Cockburn

[57] ABSTRACT

To solve the problem raised by the allocation of synchronous bandwidth on a FDDI segment when this allocation is done by a centralized Allocator in an interconnected LAN domain, a Third Party Requestor receives from Quality of Service Allocator all information that it needs to ask for bandwidth reservation on the FDDI segment. Following the Station Management standard, the Third Party Requestor is able to act on behalf of the FDDI station that will submit synchronous traffic and ask for bandwidth allocation to a Synchronous Bandwidth Allocator. According to the Synchronous Bandwidth Allocator decision, the Third Party Requestor will then answer to the Quality of Service Allocator which will grant or deny the allocation over the whole path.

4 Claims, 9 Drawing Sheets

FIG. 1
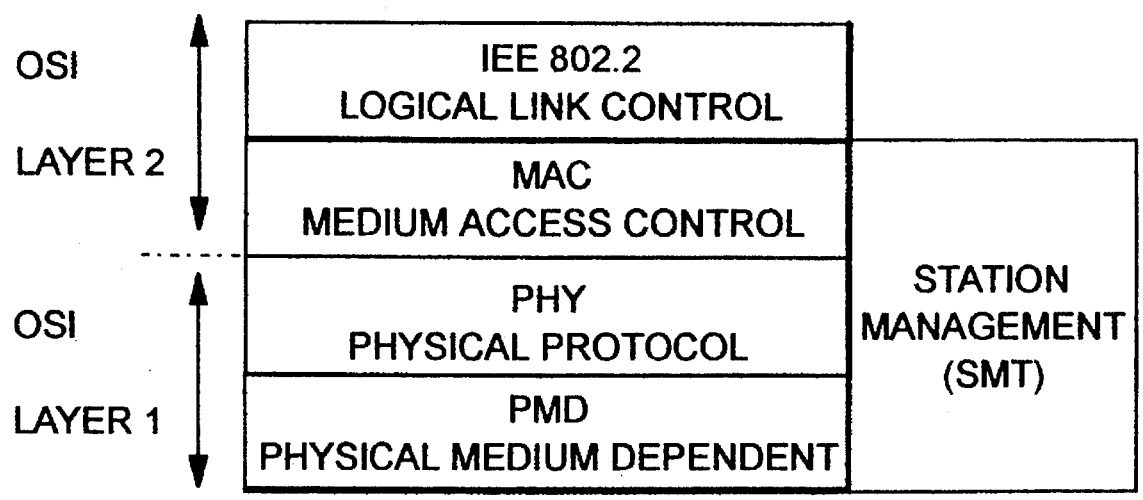
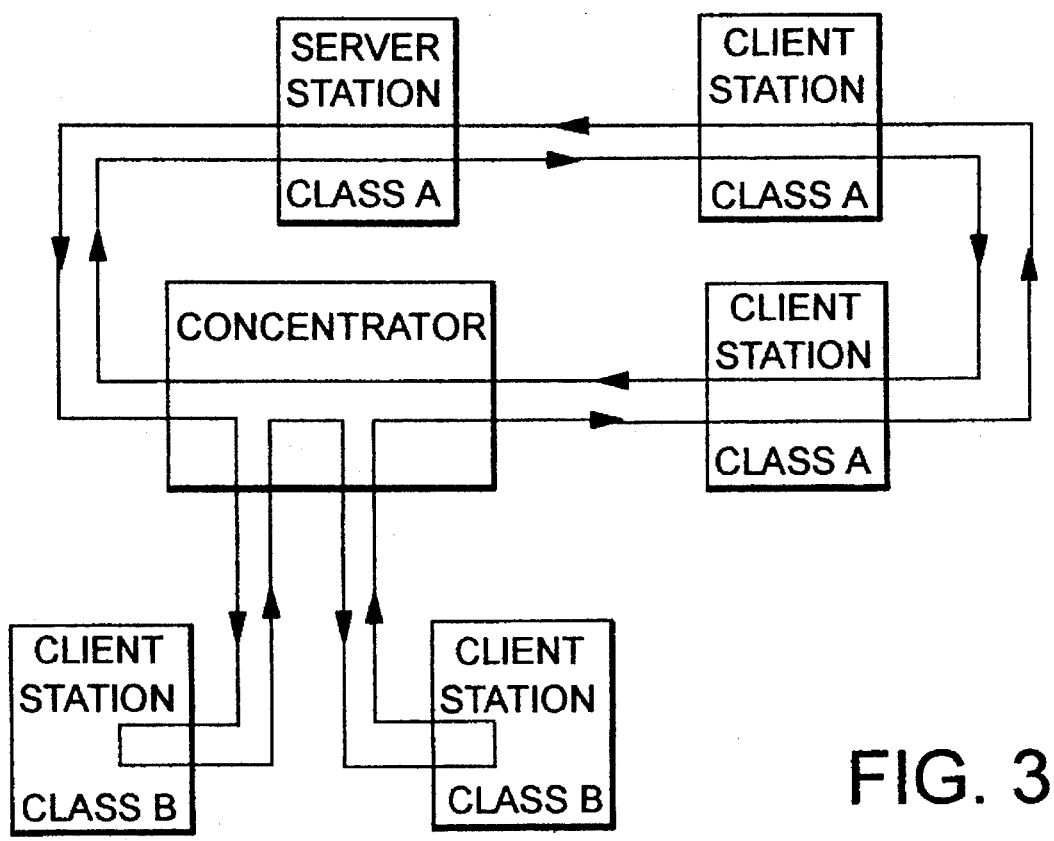
FIG. 3

FIG. 2
FDDI FRAME
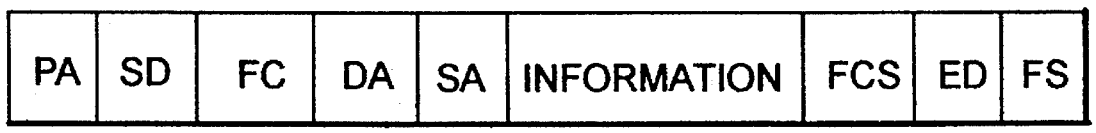
PA    PREAMBLE - USED FOR CLOCK SYNCHRONIZATION
      64 BITS
SD    STARTING DELIMITER
FC    FRAME CONTROL
DA    DESTINATION ADDRESS
SA    SOURCE ADDRESS
FCS   FRAME CHECK SEQUENCE - 32 BIT RESULT OF A
      CRC CHECK
ED    ENDING DELIMITER
FS    FRAME STATUS - ADDRESS RECOGNIZED, FRAME
      COPIED AND ERROR DETECTED BITS
SFS   STARTING FRAME SEQUENCE
EFS   ENDING FRAME SEQUENCE
FDDI TOKEN
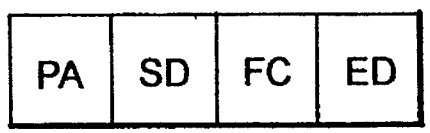

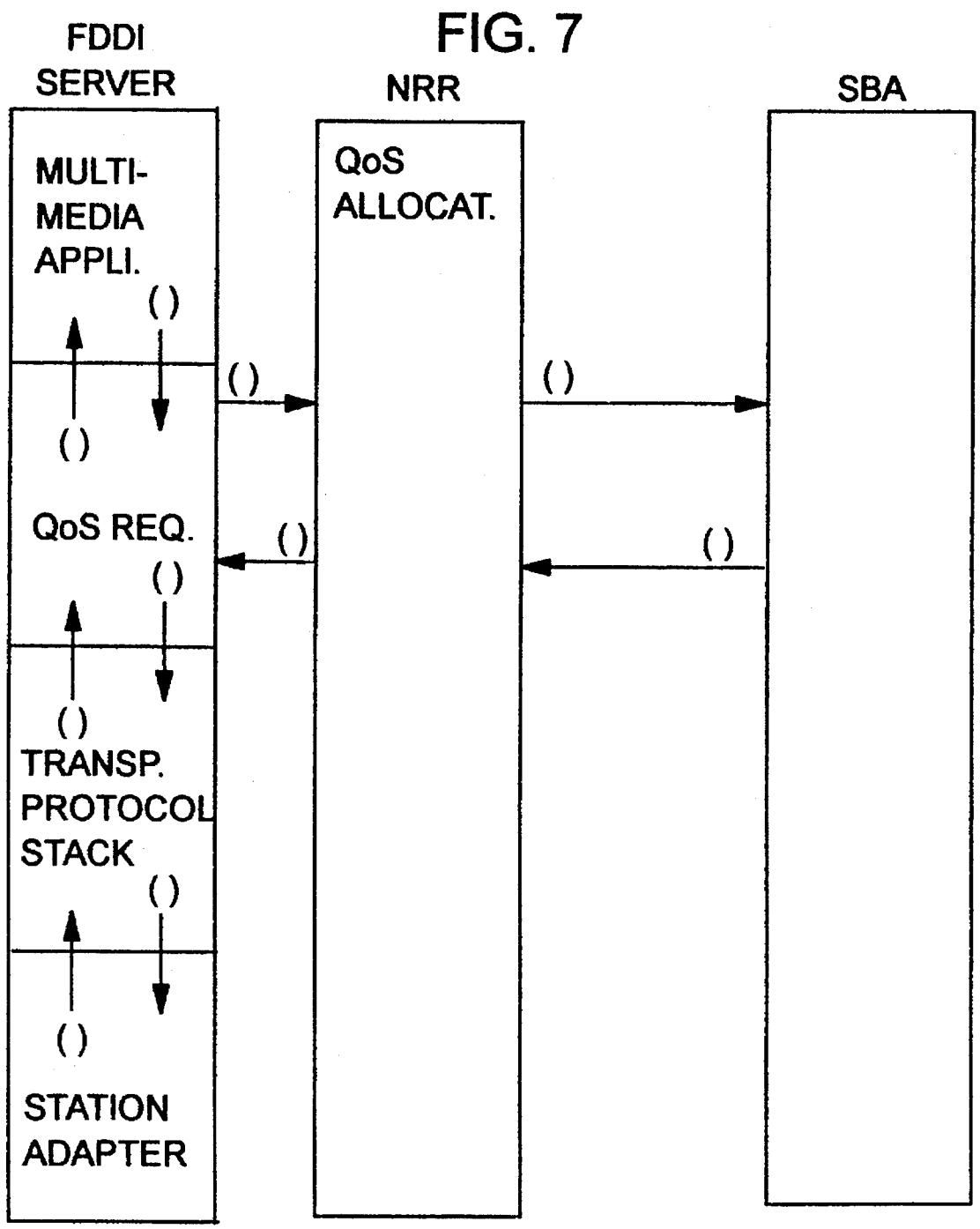

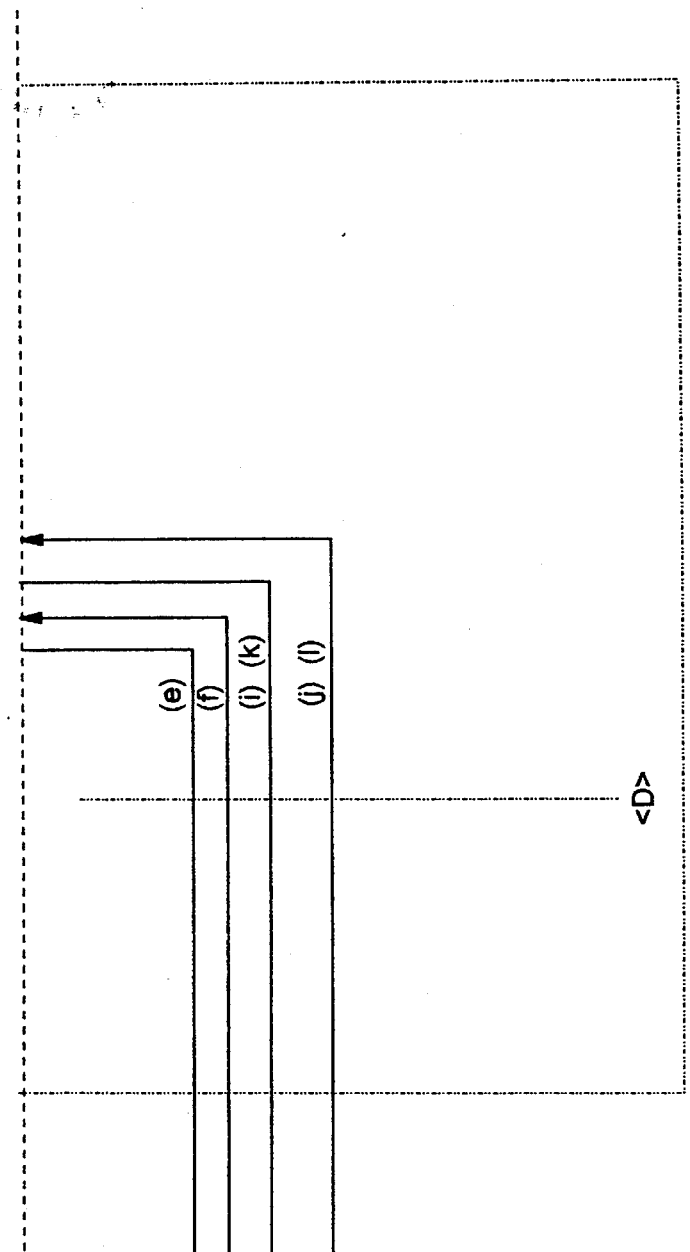

SYSTEM FOR NETWORK WIDE BANDWIDTH ALLOCATION

The present invention relates to the data communication field and more particularly to a system for network wide bandwidth allocation in a network made of at least one FDDI segment.

It is a current issue in the data communication field to allow Multimedia applications to run over interconnected networks.

More particularly, it is a current issue to fulfill the need by Multimedia applications of bandwidth and end-to-end guaranteed delay, i.e. what is called Quality of Service (QoS) Requirements.

The availability of Fiber Distributed Data Interface (FDDI) network is of great interest in this context. The telecommunication users are particularly sensitive to its response time and the guaranteed bandwidth involved in the communication through the network especially when the communications are exchanged between Multimedia applications— i.e. the possibility for a Client/Server application to transmit and receive multimedia data through a telecommunication network at any instant and without delay—.

Such QoS requirements imply that the telecommunication network be able to manage its available bandwidth and response time which are likely to change throughout time and impact the communication quality. The issue is the network-wide allocation, in a network including FDDI and interconnected Local Area Networks (LANs), such as the one shown FIG. 9.

The allocation of bandwidth is the mean to reserve a certain level of QoS on a LAN or on interconnected LANs and for that two components are put in place: an Allocator and a Requestor.

The Allocator is the Component responsible for maintaining awareness of the capacity of the LAN components—i.e. bridges and segments—, determining whether a particular request for a bandwidth allocation can be granted.

The Requestor is the component responsible for making a request to reserve a certain QoS for an application.

Further details regarding bandwidth allocation with respect to LANs can be found further.

For FDDI segments, these QoS requirements are fulfilled by usage of synchronous traffic. The synchronous allocation process is already defined and standardized as explained further.

The problem raised, based on the fact that there should be only one authority giving allocations, is how to make these two processes coexist.

It is therefore an object of the present invention to solve the problem raised by the allocation of synchronous bandwidth on a FDDI segment when this allocation is done by a centralized. Allocator in an interconnected LAN domain.

This centralized Allocator (or QoS Allocator) is responsible for doing the allocation on a network-wide basis, whatever the protocol used between the two points exchanging synchronous traffic. But to do that, it needs to interact with agents responsible for bandwidth allocation on every FDDI segment: the Synchronous Bandwidth Allocator. This interface is done by an agent named the Third Party Requestor where the invention really lies.

Instead of creating a new player in the game—i.e. as already said the Third Party Requestor—, it would have been possible for the man skilled in the art to envisage a solution as shown FIG. 7.

But this would have changed the interface between the protocol stack and the station adapter (standardized with NDIS or ODI), with the associated costs and delays in the development.

In the invention, as opposed, the Third Party Requestor receives from the QoS Allocator all information that it needs to ask for bandwidth reservation on the FDDI segment. Following the Station Management standard, the Third Party Requestor is able to act on behalf of the FDDI station that will submit synchronous traffic and ask for bandwidth allocation to the Synchronous Bandwidth Allocator. According to the Synchronous Bandwidth Allocator decision, the Third Party Requestor will then answer to the QoS Allocator which will grant or deny the allocation over the whole path.

The achievements of this invention are to enable the coexistence of two bandwidth allocation processes (the centralized allocation process from the QoS Allocator and the Synchronous Bandwidth Allocator for FDDI segments), to fully respect FDDI Station Management standards and to avoid to create a specific interface at station level between the application asking for bandwidth, and FDDI adapters.

The invention will be better understood from the following detailed description along with the following figures:

FIG. 1 shows the lower layers of the IEEE communication layer model, base for the ANSI Station Management standard used for FDDI.

FIG. 2 shows the format of a FDDI frame and a FDDI token.

FIG. 3 illustrates an example of FDDI traffic between a client and a server.

FIG. 7 shows a solution to the problem other than that of the invention.

ALLOCATION OF BANDWIDTH OVER LANS

Within the last couple of years, there has been renewed interest by many companies in developing and supporting applications that provide multimedia information to users of personal computers and stations. In general, multimedia refers to the ability to capture, manipulate, edit, store, distribute, and present information of one or more these types of data: standard text, graphics, image, animation, audio or motion video.

In many multimedia applications, information is generated or stored at devices that are remote from the using stations. In such situations, a communications network must provide the transport mechanisms from station to station while preserving the unique properties that characterize multimedia information—i.e. bandwidth and latency requirements—. In summary, multimedia applications require a method that allows the applications to specify the characteristics of a stream—i.e. transmission rate—, to request and be granted a specified bandwidth and latency for the stream, and to be assured that the requested bandwidth and latency are simultaneously satisfied in the network. These capabilities are collectively called Quality of Service (QoS) guarantees from the Local Area Network.

To meet the requirements for QoS Management on Local Area Network the following components and protocols are developed:

A QoS Requestor includes the following functions:

Accept a request for a specified QoS from a specified source of LAN traffic—i.e. a multimedia application—to a specified destination on the LAN.

Format and forward the request to the QoS Allocator on the LAN.

Receive the result of a QoS request from the QoS Allocator and inform the application of the result of the request.

Maintain information about QoS requests that have been granted by the QoS Allocator to the QoS Requestor.

A QoS Allocator includes the following functions:

Accept a request from QoS Requestor for a specified QoS from a specified Source (or station) to a specified destination on the LAN.

QoS calculation: this function examines a QoS request and the current status of allocated QoS to determine whether the network can provide the specified QoS.

Based on the calculation, decide whether to grant or reject the QoS request.

Maintain information about the status of QoS that has been allocated in the LAN and about the capacity of the network to support QoS reserved streams.

Figure 5:
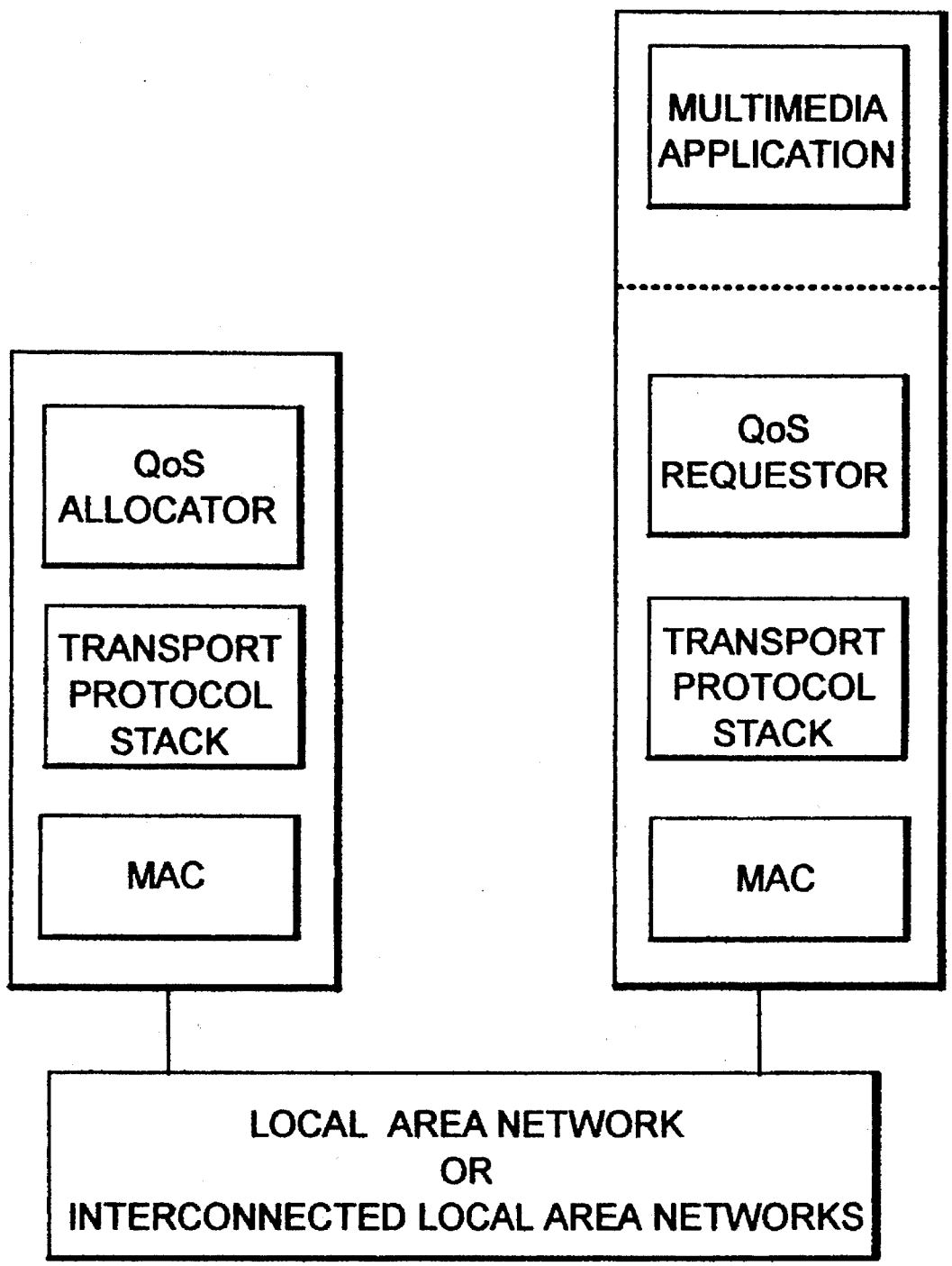
FIG. 5 illustrates the structure of QoS Allocator and QoS Requestor on a LAN.

FIG. 5 depicts the QoS Allocator and QoS Requestor structure on a Local Area Network.

Figure 6:
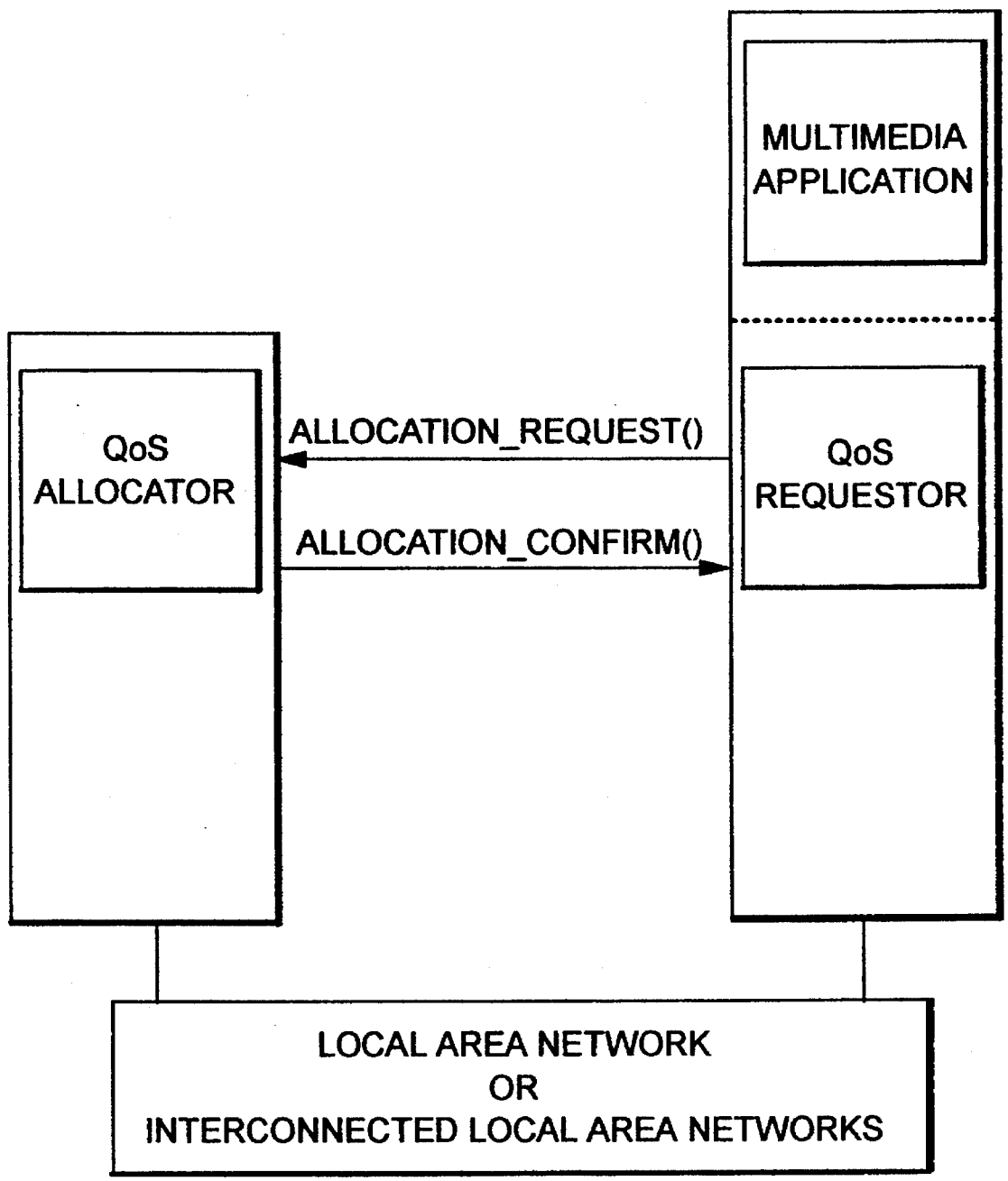
FIG. 6 illustrates an example of protocol used between QoS Allocator and QoS Requestor to allocate bandwitdh over LANs.

FIG. 6 shows an example of the communication protocol between the QoS Requestor and the QoS Allocator for QoS request and response.

More details can be found in a publication entitled 'Quality of Service Management for Multimedia Traffic on Local Area Networks', a copy of which is attached to the present application.

FDDI

FDDI describes a dual counter-rotating fiber-optic ring operating at 100 Mega Bits per seconds. FDDI uses a token-passing protocol, with each station having the chance to transmit frames when a token passes.

FDDI uses two rings, one called the primary ring and the other the secondary ring. The primary ring may be linked to the main-ring path, with the secondary ring acting as the backup ring path.

Stations, if attaching directly can attach to either or both of these rings. In order to differentiate between stations that attach to one or both rings, two classes of station are defined: a Class A station attaches to both of the rings directory, while Class B stations attach to one of the rings.

One of the prime requirements for FDDI is a high-speed establishment backbone to interconnect heterogeneous LANs. To this end, the FDDI Local Area Network design must have reliability and capacity built in. Attachment cost does not have to be so carefully limited, since most of the cheaper stations, would be connected to the lower speed Local Area Networks that were themselves bridged to the FDDI backbone.

FDDI has satisfied these requirements by:

Operating at a data rate of 100 Mega Bits per second, providing a large bandwidth.

Having a dual optical fiber ring configuration, that can be reconfigured by the class A stations in the event of a failure. This provides for reliability and recovery.

Allowing stations to attach to both of the rings or only one.

ANSI, in defining and developing the standard was able to make much use of the work already done by the IEEE. To this extent, they used a similar model for the layering of the protocols. The structure is shown in FIG. 1.

The FDDI standard assumes the use of the IEEE 802.2 logical link standard; it does not attempt to define it as part of FDDI.

MAC

In this layer, FDDI borrows very extensively to the techniques used by IEEE, particularly the 802.5 token-ring specification (the FDDI MAC is a part of ISO 9314: ISO 9341-2).

When a station wishes to transmit a frame, it must wait for a token to arrive. The token is removed from the ring by the transmitting station before actual frame transmission begins.

The frame size on an FDDI Local Area Network is limited by clocking constraints to 4500 bytes. At the FDDI data rate, and given the fact that a FDDI ring can be physically very large, it is extremely likely that the frame will be physically shorter than the length of the ring.

The frame and token structure on an FDDI Local Area Network is shown in FIG. 2.

Allocating FDDI Capacity

Because the token is always released before the frame header has returned, the priority reservation scheme that is used in a token-ring architecture to give stations priority access to the ring cannot work in FDDI. Additionally, FDDI is designed to give far greater control over the use of the ring capacity to connecting stations. The mechanism that is used is heavily dependent on timers within each station. FDDI defines two classes of traffic:

Synchronous
for which a guaranteed bandwidth is required; that is a station must gain access to the ring, and transmit its frames within a specified time period.

Asynchronous
traffic will only be transmitted when the load on the ring drops below a specified level. Such traffic might be file transfer where overall access or response time is not quite such an issue.

To control the amount of each kind of traffic that can be transmitted by a station, FDDI implements a timer token access protocol. Stations expect to see a token within a specified time interval. This interval is known as the Target Token Rotation Time (TTRT). All stations have the same value for TTRT set within them. The value is determined when a station initializes itself on the ring.

Each station measures the time between successive appearances of a token. The station uses a Token Rotation Timer (TRT) to do this.

When a token passes a station, the TRT is set to the value of the TTRT and starts to count down. If the TRT expires before the next token is seen, a counter called the late counter is incremented. The token is said to be late. Under normal circumstances, the token should reappear within the target time. The token is then said to be early.

Each time a station sees a token, three things happen:

The station may start to transmit synchronous frames.

If the TRT has not expired, that is the token was early, the remaining time is stored in the Token Holding Timer (THT). The THT is therefore the amount of time by which the token was early.

The TRT is reset to the value of TTRT and allowed to start running down again.

The station is allowed to transmit synchronous frames until a time allocated for synchronous data transmission expires (the synchronous allocation timer). This timer value may be different at each station, but the sum value of all the synchronous allocation timers on active stations must always be slightly less than the TTRT. It is up to the station management protocols to make sure that this is so.

When the timer expires, or all synchronous frames are transmitted, the station may be allowed to transmit asynchronous frames. The decision is based on the value of the late count. If the count is at zero, asynchronous frames can be transmitted for the length of time that was stored in the TTRT. When this timer runs down to zero, transmission must stop, and a token must be released.

Meanwhile, the TRT is steadily running down. It has been doing so during both synchronous and asynchronous transmission. If both of these transmissions were stopped because of timer expiration (token holding and synchronous allocation) and assuming that other stations have frames to send, the TRT will almost certainly expire before the token is seen again. The token is late; the late counter will be incremented, there will be no value to put in the TTRT, and the station will not be allowed to send any asynchronous frames the next time it does see the token. In a way, the station has paid a penalty for having had so much traffic to send. This penalty only applies to asynchronous traffic however; a Station may always transmit synchronous traffic when it sees a token.

When the next token arrives early, the late counter is decremented. When the value gets to zero, the station will be able to transmit asynchronous traffic once more.

When this operation is considered across all stations on the ring, the capacity allocation algorithm is attempting to keep the actual TRT less than the target. Since synchronous traffic can always be sent, the mechanism guarantees an amount of bandwidth to the synchronous traffic. Asynchronous traffic is only sent when there is spare capacity on the LAN, and fairness of station access is maintained.

Using this mechanism, FDDI network is able to cope with traffic needing a defined amount of Synchronous Bandwidth— i.e. Multimedia traffic—, and also support the bursts traffic whose response time requirement is less defined.

Physical Protocol (PHY)

As in the IEEE standards, the physical layer specifies the signalling rate, encoding and clocking of the Local Area Network. For FDDI the data rate on the ring is 100 Mega Bits per second.

The FDDI Physical Protocol is a part of ISO 9314: ISO 9341-1.

Physical Medium Dependent (PMD)

This layer is used to specify the fiber type and size used by FDDI, the connectors, and the wavelength of the light beam that is transmitted down the fiber.

The FDDI Physical Medium Dependent is a part of ISO 9314: ISO 9341-3.

Station Management (SMT)

This layer defines the protocols that stations use to communicate, so as to set their timers; the TTRT or their synchronous allocation timers for example. Without a consistent set of protocols which are used by all stations that attach to the ring(s), it is impossible for FDDI to deliver the function, capacity and performance for which it was designed.

The FDDI Station Management is a part of ANSI X3T9: ANSI X3T9-5.

Station Management provides a number of Frame-Based services and functions that may be used by higher-level functions to gather information about and exercise control over the attached FDDI network.

A number of the Station Management frame protocols are request-response frame protocols. These protocols are carried out between a single requester and one or more responders, depending on the addressing mode of the request frame.

Neighbor Notification

This protocol performs the following functions:

It determines a logical upstream neighbor address and its logical downstream neighbor address.

It detects a duplicate address on an operational FDDI ring.

It generates a periodic frame handshake that verifies the operation of the local station.

The protocol performs these functions by periodically initiating a request-response frame exchange between a station and its nearest downstream neighbor. The frames used are the Station Management Neighbor Information Frames.

Status Report Protocol

A station performs the Status Report Protocol to periodically announce Station Status that is useful in managing a FDDI network. This status information is carried in Status Report Frames.

Parameter Management Protocol

This protocol performs the remote management of stations attributes. It is accomplished via Parameter Management Frames. The Parameter Management protocol operates on all Station Management Management Information Base (MIB) attributes, attribute groups and actions.

Station Status Polling

A mechanism is provided for aggregate Station Status to be obtained remotely through a polling (request/response) protocol. This protocol is carried out using the Status Information Frames.

Echo Protocol

This protocol is provided for station-to-station loopback testing on a FDDI ring. The Echo protocol is carried out using Echo frames which may contain any amount up to maximum frame size supported by the FDDI standards, of implementation specific Echo data.

Synchronous Bandwidth Allocation

This protocol provides for a deterministic mechanism for allocation of Synchronous Bandwidth and supports monitoring for over-allocation of synchronous and total bandwidth.

The protocol supports the following functions:

Manage the allocation of the limited Synchronous Bandwidth resource.

Monitor the amount of Synchronous Bandwidth allocated for use.

Monitor the ring for over-allocation of Synchronous Bandwidth.

The protocol performs the allocation functions through a request-response frame exchange between a station using Synchronous Bandwidth and a Synchronous Bandwidth management process. The frames used are the Resource-Allocation frames.

The Station Management provides the specification of management information related to the operation of the Station Management This information that is supplied to higher-level function— i.e. System Management—is represented using an object oriented approach consistent with the approach taken by OSI Management Standards. Station Management Information is described in terms of Managed Objects. The Station Management standard defines four Managed Object Classes:

The SMT managed object class models the management information for a FDDI station.

The MAC managed object class models the management information for the MAC entities within a station.

The PATH managed object class models the management information required for the management of configuration paths within a station, The PORT object class models the management information required for the Physical Protocol/Physical Medium Dependent entities within a station.

FIG. 3 shows an example of a FDDI network allowing communication between server station and client stations via a FDDI ring. Server station which can be for example an IBM Risc 6000 computer is connected to the ring. Similarly client stations which can be for example IBM Personal System/2 computers, are connected to the ring. Server station is loaded with its respective application programs such as video server or graphic data server.

Server station and client stations being connected to the same FDDI network, are loaded with Station Management program.

Allocation of Synchronous Bandwidth over FDDI

The allocation of Synchronous Bandwidth over a FDDI network is performed using the Resource Allocation Frame protocol. This protocol assumes one central allocator of the Synchronous Bandwidth resource, and provides for the management of Synchronous Bandwidth Allocator, the detection of over-allocation, and ability to recover from faults due to over-allocation.

Figure 4:
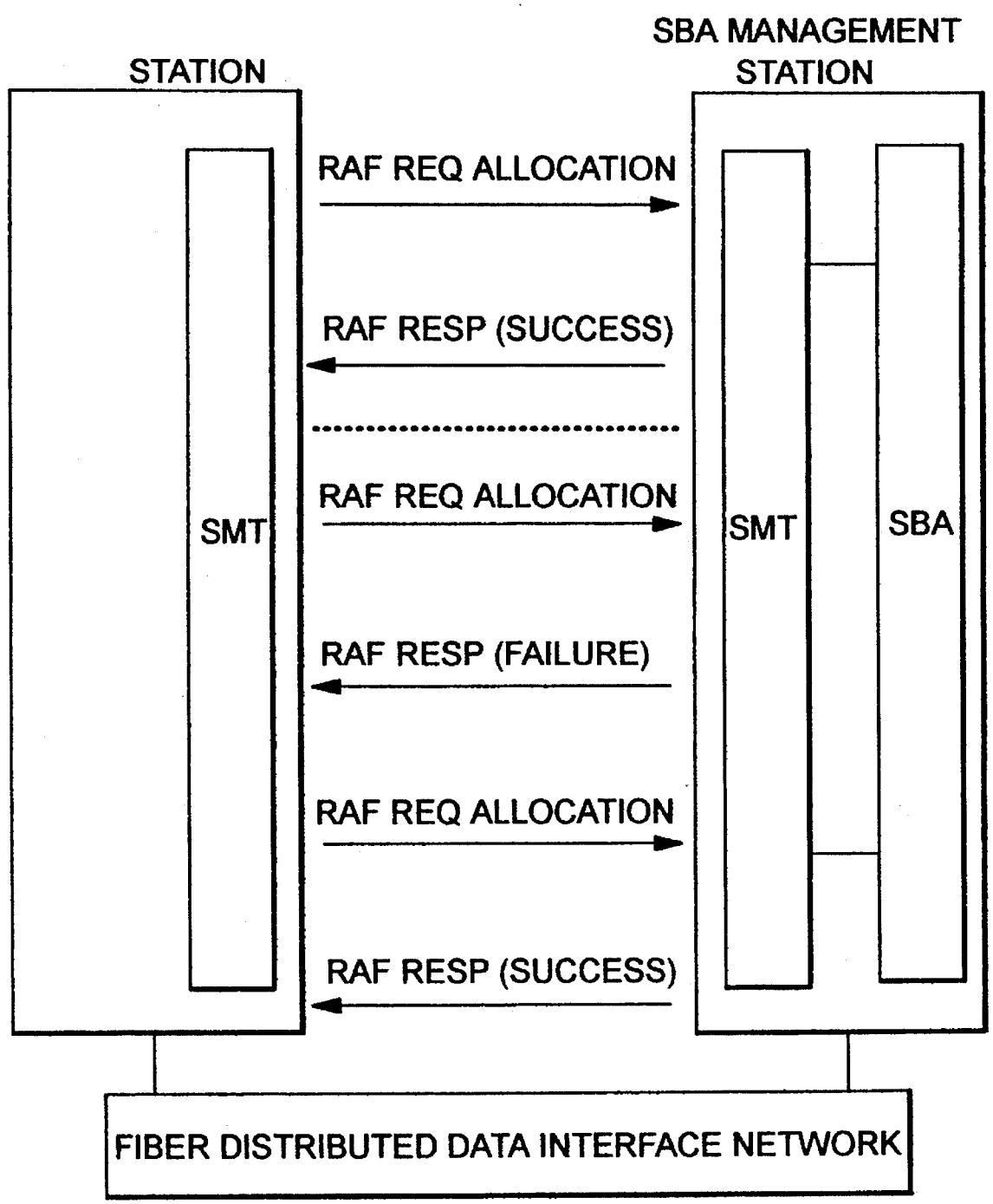
FIG. 4 shows the allocation of bandwidth over a FDDI network.

FIG. 4 shows an example of an allocation of Synchronous Bandwidth. A station must receive an allocation of Synchronous Bandwidth before initiating synchronous transmission.

A station that wants to change its current allocation of Synchronous Bandwidth must request the new allocation amount from the Synchronous Bandwidth Allocator Management station.

To request a change in allocation, a station sends a Resource Allocation Frame Request (Request Allocation) to a Synchronous Bandwidth Allocator Management station. A Synchronous Bandwidth Allocator Management station will respond with a Resource Allocation Frame Response indicating success or failure of the request. If the request fails, the station may adjust its allocation request to within the available bandwidth specified in the response frame and restart the exchange.

The Station changes its Synchronous Bandwidth attributes— i.e. in the Management Information Base— when response indicates successful allocation.

Description of the Preferred Embodiment of the Invention

Figure 8A:
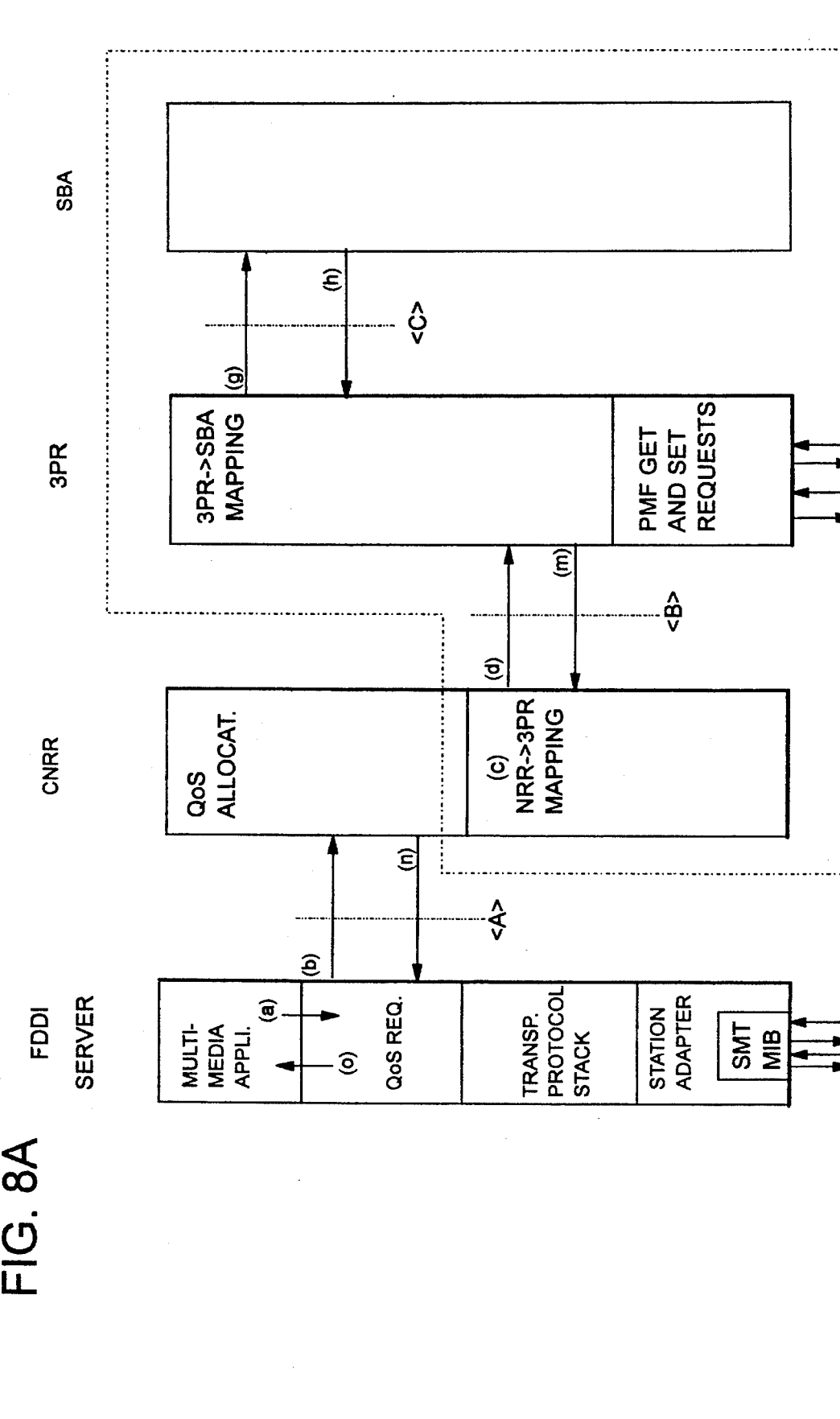
FIG. 8 shows an overview of the present invention.
Figure 9:
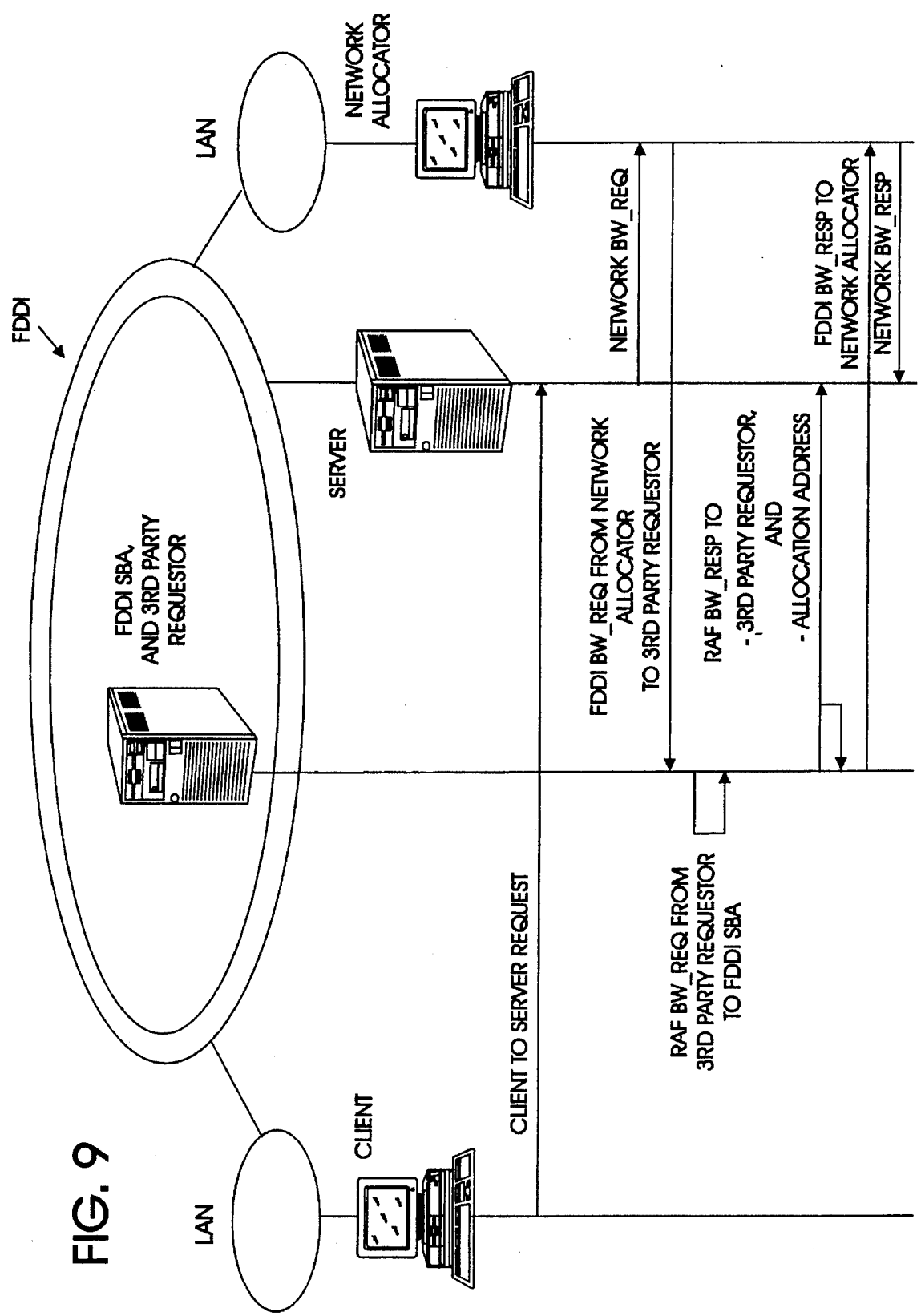
FIG. 9 shows an example of interconnected FDDI and LAN networks.

The invention is more particularly described with respect to FIG. 8.

In the synchronous bandwidth allocation process, the QoS Allocator is responsible for Network-wide allocation. But if a segment in this path is of FDDI nature, the bandwidth allocation on this segment is managed by a local agent named Synchronous Bandwidth Allocator. The FDDI bandwidth allocation process is defined by the Station Management standard defined by ANSI. It uses specific frames, named Resource Allocation Frames (RAF frames) defined by Station Management.

Since is available a bandwidth allocation process defined by a standard, it is the solution of the invention to follow it and create a mechanism to exchange data between the two processes. This is the role of a Third Party Requestor. This agent is the interface between the QoS Allocator and the Synchronous Bandwidth Allocator. It receives requests from the QoS Allocator, like 'AllocationRequest' or 'ChangeRequest'. Before answering by 'AllocationConfirm' or 'ChangeConfirm' it should consult the Synchronous Bandwidth Allocator, authority on FDDI segment, acting on behalf of the FDDI station asking for bandwidth. Hereafter is the sequence of events that happens in this case:

Mapping between QoS Allocator parameters and Third Party Requestor parameters Upon reception of an 'AllocationRequest' or 'ChangeRequest' frame (flow b, named 'NRR_Req' on FIG. 8) from a QoS Requestor, the QoS Allocator performs some mappings (action c) between the generic parameters used for a multi-segment allocation and the parameters necessary for an allocation over a single FDDI segment. With these specific FDDI parameters, the QoS Allocator sends a 'AllocationRequest' or a 'ChangeRequest' frame to the Third Party Requestor (flow d named '3PR_Req').

Mapping is defined as follows:

TABLE 1

| Parameters mapping | |
|---|---|
| NRR_Req Parameters | 3PR_Req Parameters |
| Troughput | Payload |
| Proposal 50 bytes | Overhead |
| Source MAC address | Allocation address |
| Access Class | SBA Category |
| End-to-end delay | Max T_neg |
| Average Packet size | Min Segment_size |

Note:
Note: Must not have more than one outstanding allocation per MAC address.

Sequence of events within Third Party Requestor to allocate bandwidth on FDDI segment Upon reception from the QoS Allocator of the 'AllocationRequest' or 'ChangeRequest' flows, the Third Party Requestor will issue on the FDDI ring a flow e, Station Management frame 'PMF Get Request', to the FDDI server in order to get two Management Information Base (MIB) attributes FddiPayload and FddiOverhead.

The FDDI server should answer, sending back to the Third Party Requestor a flow f, Station Management frame 'PMF Get Response', giving the attributes requested.

The Third Party Requestor is now able to send the flow g to the Synchronous Bandwidth Allocator, 'SBA RAF Allocation Request', since it received all elements needed to build the frame (payload, overhead, allocation address, SBA Category, Max T_Neg, Min Segment_Size).

The Synchronous Bandwidth Allocator grants or denies the request. It answers accordingly to the Third Party Requestor by the flow h, 'SBA RAF Allocation Response'.

Before the multimedia application can start, assuming that its request was granted, the Third Party Requestor must first update the FDDI server MIB attributes to comply with the Station Management standard. The Third Party Requestor sends then flow i, Station Management frame 'PMF Set', to update the FddiPayload MIB attribute.

To this previous flow, the FDDI server should acknowledge the request and sends the flow j, Station Management frame 'PMF Set Response', back to the Third Party Requestor.

The same process is repeated to update the FddiOverhead MIB attribute: the Third Party Requestor sends flow k, Station Management frame 'PMF Set' to the FDDI server.

The FDDI server answers to the Third Party Requestor, sending back flow l, Station Management frame 'PMF Set Response', attesting that the change was made.

Response from Third Party Requestor to QoS Allocator

The Third Party Requestor is now able to send the flow m to the QoS Allocator, 'Allocation Confirm' or 'ChangeConfirm'.

The QoS Allocator answers to the QoS Requestor by a flow n, 'AllocationConfirm' or 'ChangeConfirm'.

According to this answer, the QoS Requestor authorizes or refuses the multimedia to start its synchronous traffic.

We claim:

1. A system for network wide bandwidth allocation in a network made of at least one FDDI segment and at least one non-FDDI Segment, said system comprising:

a server coupled to the FDDI segment and comprising a Quality of Service Requestor for requesting quality of service, a network bandwidth allocator (NRR) comprising a Quality of Service Allocator, coupled to the non-FDDI segment, for getting requests and setting answers from and to said Quality of Service Requestor, a synchronous bandwidth allocator (SBA) on said FDDI segment for allocating bandwidth on said FDDI segment, said system being characterized in that the system comprises:

a third party requestor (3PR), with Inputs/Outputs for interfacing between said network bandwidth allocator (NRR) and said synchronous bandwidth allocator (SBA), and Inputs/Outputs for interfacing between said server and said synchronous bandwidth allocator (SBA), and means (C) in said network bandwidth allocator (NRR) having Input/Output for interfacing between said Quality of Service Allocator and said third party requestor (3PR).

2. In a network having at least one FDDI segment and at least one non-FDDI segment; a system for providing network wide bandwidth allocation comprising:

a server coupled to the network comprising at least Quality of Service Requestor to request quality of service;

a network bandwidth allocator (NRR) coupled to the non-FDDI Segment said network bandwidth allocator comprising a Quality of Service requestor for receiving requests from and returning answers to said Quality of Service requestor;

a synchronous bandwidth allocator (SBA) on said FDDI segment for awarding bandwidth on the FDDI segment; and a third party requestor (3PR) coupled to the network; said third party requestor requesting from said synchronous bandwidth allocator bandwidth allocation in response to requests from said network bandwidth allocator and issuing a response to said network bandwidth allocator as a result of a response from the synchronous bandwidth allocator.

3. The system of claim 2 further including a multi-media application running on the server.

4. The system of claim 3 further including a client station connected to the non-FDDI segment, said client station running an application for communicating with the multimedia application.

* * * * *